United States Patent [19]

Stagemeyer et al.

[11] 4,116,007
[45] Sep. 26, 1978

[54] DEPLOYABLE BARRIER APRON APPARATUS FOR USE WITH CONTAMINANT RECOVERY SYSTEMS

[75] Inventors: Merlin D. Stagemeyer, Northbrook, Ill.; Seth Ford Allcorn, Columbia, Mo.

[73] Assignee: Oil Spill Recovery, Inc., Northbrook, Ill.

[21] Appl. No.: 779,676

[22] Filed: Mar. 21, 1977

[51] Int. Cl.² .................. E02B 15/04; B01D 17/02
[52] U.S. Cl. .................. 405/66; 210/242 S; 210/DIG. 25
[58] Field of Search ............ 61/1 F; 114/39, 267, 114/292; 210/88, 242 S, DIG. 25

[56] References Cited
U.S. PATENT DOCUMENTS

| 3,532,219 | 10/1970 | Valdespino | 210/DIG. 25 |
| 3,563,036 | 2/1971 | Smith et al. | 61/1 F |
| 3,645,099 | 2/1972 | Saavedra | 61/1 F |
| 3,648,463 | 3/1972 | Ayers | 61/1 F |
| 3,818,708 | 6/1974 | Benson | 61/1 F |

Primary Examiner—Charles N. Hart
Assistant Examiner—Robert H. Spitzer
Attorney, Agent, or Firm—Fitch, Even, Tabin & Luedeka

[57] ABSTRACT

A readily deployable barrier apron is used with contaminant recovery systems to encompass contaminant material or to channel such material to collection devices. An upper apron member which is impenetrable has a lower penetrable member attached. Deployment devices such as hinging segments or spooling rolls of such apron barrier are utilized with an uprighting construction to provide for a quickly deployable, ready to use, and easy to control barrier construction for such uses as the containment of oil spills.

10 Claims, 10 Drawing Figures

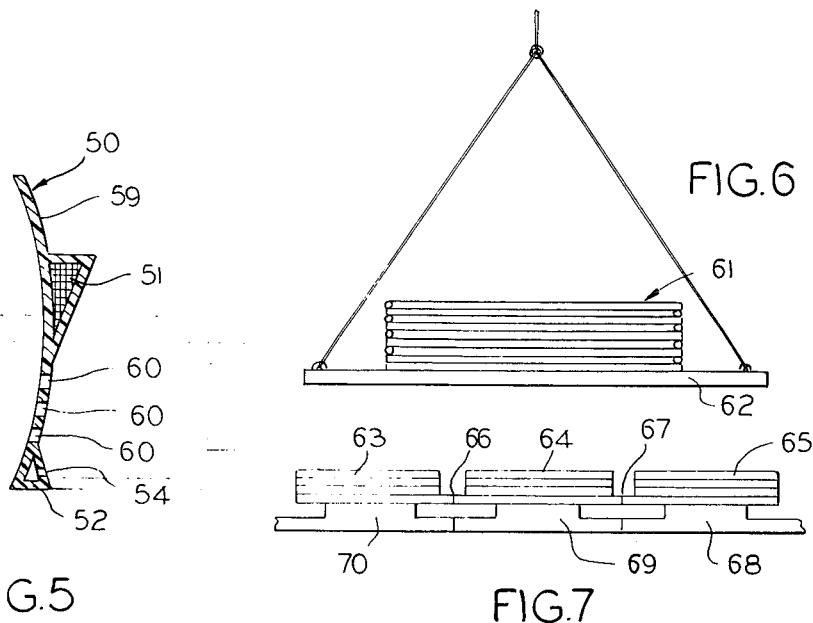
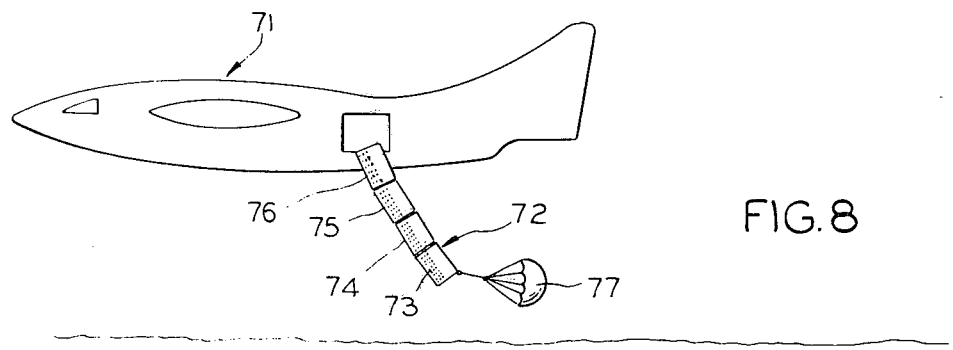
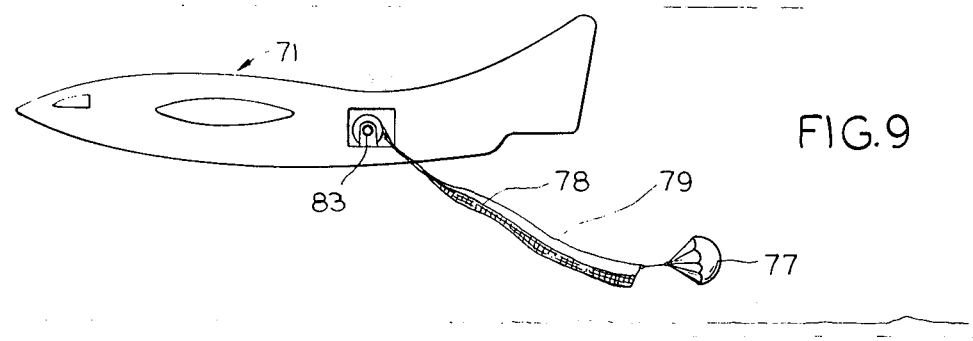

DEPLOYABLE BARRIER APRON APPARATUS FOR USE WITH CONTAMINANT RECOVERY SYSTEMS

BACKGROUND OF THE INVENTION

The present invention relates in general to pollution abatement apparatus and, in particular, to contaminant recovery systems for removing and/or recovering contaminant materials from the surface of a body of water.

Only recently has there been an overwhelming realization for the importance of protecting various elements of the earth's environment. In the area of water pollution, for example, society has only started to pay the price for years of careless, indiscriminate pollution of our oceans, rivers and lakes. Industrial wastes and refuse, public sanitation wastes, and mammoth oil spills are only some of the sources of pollution responsible for the virtual destruction of many of our bodies of water. One recent oil spill, for example, responsible for the dumping of millions of gallons of unrefined crude oil into the ocean, attested to the severity of our pollution problems in the form of marred beaches, wildlife destruction, and millions of dollars expended merely to trace the direction of the spill and determine its environmental impact. The overall damaging effects must be realized to include the virtual loss of extremely valuable and expensive resource material itself which could not and has not been recovered for reuse and/or reclamation.

It thus becomes apparent that there exists at present an overwhelming need for systems, apparatus, and the like which make possible the recovery of contaminant material from a myriad of bodies of water in order to prevent the destructive consequences now being encountered. These systems at the same time must be capable of recovering and reclaiming the often valuable resources causing the pollution itself.

Several relatively recent inventions have been directed to just these purposes. Some of these devices, for example, are directed primarily to the separating of oil and solids from water. While these are necessary elements for any attempt to recover the lost contaminant, for the most part, these inventions fail to solve the problem encountered with actually recovering the contaminant from the body of water before separation is attempted.

Other inventions have ranged from the utilization of flexible shields within a boat hull to act as a buffer in case of collision so as to protect an oil cargo; to vacuum inventions in which contaminant material is sucked into a vacuum hose suspended just below the surface of the water to fill a tank. With such a device the oil and water are sucked in together and, if given enough time, separate by gravity, at which time the water can be drained from the bottom of the tank and the oil reused.

In one invention, oil is removed from the surface of water by applying a mixture of wax and a volatile inflammable substance. The resulting mixture is ignited, the wax fuses into a solidified mass and is then picked up. Such an invention is embodied in U.S. Pat. No. 3,785,972. In U.S. Pat. No. 3,785,496, a carbohydrate fatty acid ester in powder, fibrous, or granular form, is applied to spilled oil on water. After picking the absorbent material back up, much of the oil is claimed to be recovered.

Several types of skimming devices have been utilized for the recovery and reclammation of contaminants such as oil. One type of oil skimming device, referred to as a drum type skimmer utilizes a rotating drum or cylinder covered with an oil absorbent material to absorb the oil from the oil and water mixture. The surfaces are generally not wetted by water but instead only by oil. The oil is squeezed or scraped off the surface of the drum by a knife blade or by rollers and then segregated from the water. It should be noted that the effectiveness of this type of skimmer is substantially small due to the substantial inefficiency utilized in skimming and withdrawing the oil from the saturated drum.

Another type of oil skimming device utilizes an oil absorbent surface on a continuous belt to absorb the oil from an oil and water mixture. In a manner equivalent to the drum type skimmer, this belt type skimmer carries the oil to the top of the belt mechanism where a blade or similar piece of equipment squeezes the oil from the belt before recycling. The belt is supported normally on two drums: one to submerge the belt in the oil and water mixture, and the other out of the mixture where the removal of the oil takes place. Besides encountering the inefficient removal problems discussed previously with the drum type oil skimmer, such a belt type oil skimming device is generally limited to calm waters or where oil films are of considerable thickness.

Another type of apparatus removes a surface layer of low density from a body of liquid of higher density. This Weir type of skimming device comprises a flexible pipe or pipes surrounded by a layer of buoyant material in an outer sheath so that the flexible pipes float on the surface of the body of liquid. A number of suction nozzles connected to the flexible pipes, a filter for separating the surface liquid from the liquid of the body and a method for discharging the separated water back into the main body of water are all incorporated into the apparatus. In operation, the pipeline is laid on the surface of the sea so that it surrounds the patch of oil which is to be removed. The suction nozzles dip into the surface layer and the contaminant and a certain amount of sea water are sucked into the piping and carried into a ship where it is forced to a filtering apparatus to separate the oil from the water.

The problems with existing contaminant recovery systems include their inability to accommodate all the variations that can occur with regards to (1) the type of contaminant being recovered, (2) the characteristics of the body of water from which the contaminant is being recovered, and (3) the temperatures of and reaction by the water and the contaminant to one another. For example, while some recovery devices work relatively well in calm waters, these devices have little, if any, effectiveness with turbulent or rolling seas which often complicate the recovery process. Further, all contaminants are not in the same material form. For example, three different types of petroleum contaminants, sweet, sour, and asphaltic, all provide different recovery problems for a skimming or recovery system. Asphaltic oil on the surface of substantially cold water, virtually hardens into an asphalt-like material which needs to be removed more like a solid than a liquid. Additionally, extremes in temperature of any body of water causes a contaminant located thereon to possess different and sometimes peculiar characteristics which cannot often be handled by the conventional skimming apparatus.

For the most part, the conventional skimming, vacuum, or other type of recovery devices require substantial machinery and investment, and are often cumbersome and difficult to deploy and control. Additives which break down the petroleum substance might offer a viable alternative to assist the environment but at the same time they destroy the resource that could be recovered. Various types of barrier restraints which merely surround the contaminant to keep it from spreading, again, protect the environment while doing little in the way of recovering a substantially valuable resource.

It is thus an object of the present invention to provide a system for effectively removing from the surface of a body of water petroleum and/or many other types of undesirable contaminants including vegetation or refuse, while at the same time recovering the contaminant in its original form for reuse or reprocessing.

It is further an object of the present invention to be flexible for use with many different types of contaminants in several types of bodies of water at varying temperatures.

Additionally, it is an object of the present invention to improve the recovery rate and efficiency with which the contaminant is recovered while at the same time being relatively easy to deploy and control.

Further, it is an object of the present invention to provide a system for effectively recovering the contaminant at a substantially reduced cost and with a minimum of manpower.

These and other objects of the invention will become apparent in light of the present specification.

SUMMARY OF THE INVENTION

The present invention comprises a readily deployable barrier apron apparatus for utilization with contaminant material recovery systems to encompass the contaminant material floating on the surface of a body of water. The apparatus comprises upper impenetrable apron means which extends from below the bottom surface of the contaminant material on the body of water, to a position substantially above the upper surface of the contaminant material; and lower penetrable apron means extending downwardly from the upper apron member from a position beneath the lower surface of the contaminant material for maintaining the apparatus in a generally upright position in the body of water, while stabilizing the apparatus while it is moved through the body of water. Additionally, the invention comprises deployment means for quickly and easily deploying the apparatus in the body of water, as well as uprighting flotation means for effectively positioning the apparatus in an upright position in the body of water, and for maintaining the apparatus afloat in the body of water.

In one embodiment of the invention, the apparatus includes an upper impenetrable apron means comprising a substantially plastic non-porous member, and a lower penetrable apron means comprising a substantially porous screen member attached thereto. In another embodiment of the apparatus, the upper and lower apron means are integrated into a single integral apron member of plastic material which is impenetrable along an upper portion, and penetrable along a lower portion, with the lower portion having a plurality of lower portion apertures fabricated therein to provide for liquid penetration. In either of these two embodiments, the uprighting flotation means comprises buoy means which are attached to the outer periphery of the upper and lower apron means, or the outer periphery of the upper and lower portions, by buoy attachment means.

In the preferred embodiment of the invention the deployment means comprise a plurality of hinged apparatus segments to accommodate stacking the apparatus in a minimum of space and for enabling the quick, efficient extension of the apparatus with a minimum of effort. When strings of stacked apparatus segment are to be joined for an overall lengthy deployable barrier apron, undercut pallet means facilitate the connection of each of these stacked runs of apparatus segments to one another to form a substantial continuous barrier apron. Alternatively, in order to provide for the quick and easy deployment of the apron apparatus when it is formed of the plastic material which could be substantially flexible, roller means are utilized on which the apparatus is spooled. Through either of these deployment means, it should be readily apparent that deployment form airplanes and/or boats will be facilitated.

The preferred embodiment of the invention calls for yet another embodiment of the apron barrier, in which the upper and lower apron means, the deployment means, and the uprighting flotation means are operably integrated into an integral apron member. This apron member is divided into substantially small apron segments, which may be hingedly attached to one another for quick and easy deployment. Additionally, the apparatus utilizes aperture channel means proximate to the lower penetrable apron means for the entry of water therein to provide ballast for the lowering of that portion into the water. Integrated buoyancy channel means are located proximate the upper apron means for maintaining the upper apron proximate to the surface of the body of water, thereby quickly and efficiently uprighting the device no matter which position it is in when dropped into the water. In this preferred embodiment, each of the apron segments are curved longitudinally in order to provide a more effective barrier toward the contaminant material.

The preferred embodiment of the invention includes a plurality of shorter apron segments pinned to one another in order to maintain a surface position on a body of water that is rolling or turbulent.

BRIEF DESCRIPTION OF THE DRAWINGS

FIG. 5 is a cross-sectional side view of the invention shown in FIG. 4, taken along lines 5—5 and looking in the direction of the arrows;

FIG. 6 is a front elevational view of a plurality of hinged apparatus segments stacked for improved deployment in one continuous run;

FIG. 7 is a front elevational view of several runs of hinged apparatus segments which utilize undercut pallet means for facilitating the connection of each run of apparatus segments to an adjacent run of apparatus segments;

FIG. 8 is a schematic representation of the deployment of the stacked, hinged, apron means herein described, from an airplane;

FIG. 9 is a schematic representation of deployment of another embodiment of the invention being deployed by spooled roller means from an airplane; and FIG. 10 shows the deployment procedure shown in FIG. 9 and applied to a boat resting on the body of water into which the apron barrier will be positioned.

DETAILED DESCRIPTION OF THE DRAWINGS

Figure 1:
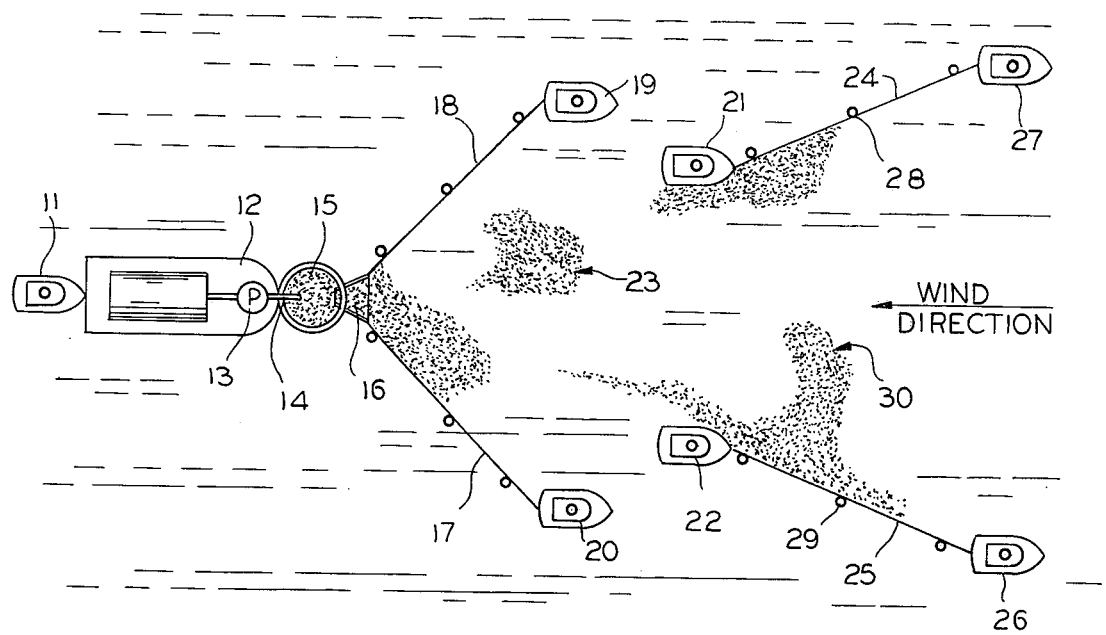
FIG. 1 of the drawings is a top schematic view of but one contaminant recovery system in which use of the present invention is contemplated.

While this invention is susceptible of embodiment in many different forms, there is shown in the drawings and will herein be described, several specific embodiments with the understanding that the present disclosure is to be considered as an exemplification of the principles of the invention and is not intended to limit the invention to the embodiments illustrated.

The contaminant recovery system as shown in FIG. 1 is one such recovery system with which the present invention could be used. The particular system shown is the subject matter of a co-pending application by the present inventors. In this drawing, the overall system is shown removing and recovering contaminant materials, such as contaminants 23 and 30 from a body of water. Towboats 27 and 21 and 26 and 22, respectively, utilize the barrier apron means of the present invention, 24 and 25 respectively, to pre-channel contaminants into equivalent barrier aprons 18 and 17, towed by towing means 19 and 20. Barrier means 18 and 17 converge into and towards collection point 16, at which time the contaminant material is collected and removed from the body of water for reuse and/or reclamation. At the collection point 16, a contaminant material 15 is discharged into a collection means 14 which transfers the contaminant material 15 therein into a permanent storage means 12 by means of a pump 13. The permanent storage means is propelled by a tow boat 11 traveling at the same velocity of tow boats 19 and 20. Buoys 28 and 29 may be attached to the apron means 24.

Figure 2:
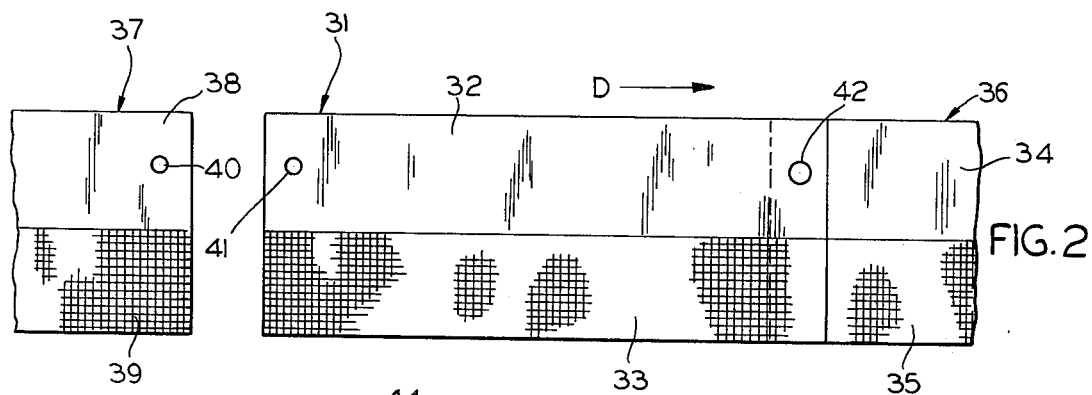
FIG. 2 is a side perspective view of one embodiment of the invention, showing, particularly, the segmented construction of this embodiment.

In the barrier apron apparatus shown in FIG. 2, the upper and impenetrable apron means 34, comprises a substantially plastic non-porous member 32 or 38, to which lower penetrable apron means 35 is attached. These lower penetrable apron means comprise a substantially porous screen member 33 or 39, which assists in the positioning and stabilization of the barrier apron apparatus when it undergoes movement with the recovery system, as depicted by FIG. 1. In the particular embodiment shown in FIG. 2, the barrier apron apparatus comprises a plurality of apron segments 36, 31 and 37, pivotally attached to one another at pinned points 40-41 and 42, to facilitate the constant surface positioning of the barrier apron apparatus relative to a turbulent and rolling body of water. The directional arrow D indicates the longitudinal direction of the barrier apron apparatus.

Figure 3:
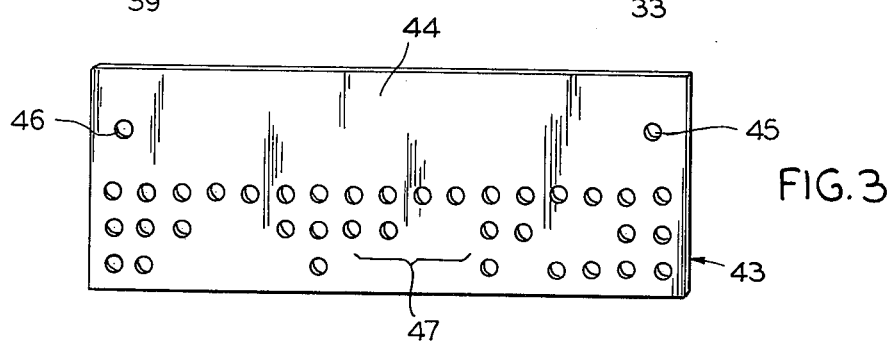
FIG. 3 is a side perspective view of the single integral apron member.

A second embodiment of the barrier apron is shown in FIG. 3 in which barrier apron 43 comprises upper portion 44, which is impenetrable, and a lower portion which is penetrable due to a plurality of lower portion apertures fabricated therein, such as those shown by apertures 47. Segment attachment points 45 and 46 are also shown in FIG. 3 and provide the pivot points through which segment 43 could pivot relative to adjoining equivalent segments.

Figure 4:
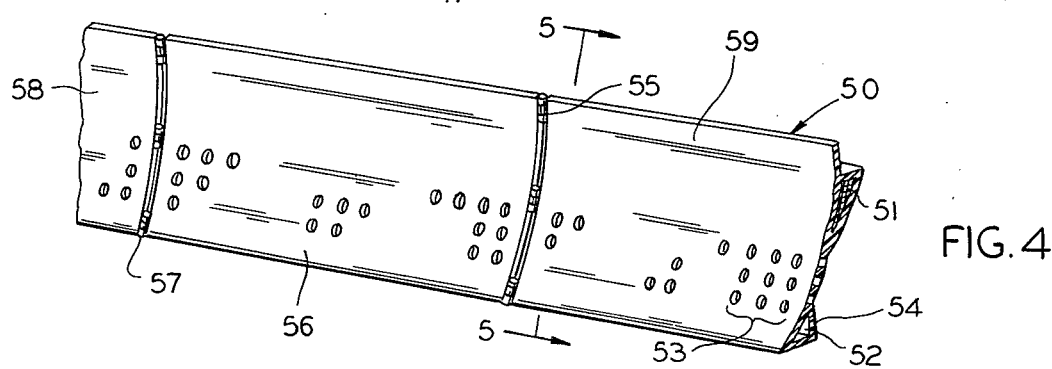
FIG. 4 is a side perspective view of a preferred embodiment of the invention, in which the apron means, deployment means, and uprighting flotation means are operably integrated into a single integral unit.

FIG. 4 of the drawings shows barrier apron 50, in which upper and lower apron means 59 and 53, respectively, as well as the deployment means and uprighting flotation means merged operably into an integral apron member. As can be seen, apron 50 is divided into substantially small apron segments, such as segments 56 and 58, which are hingedly attached at hinges 55 and 57 for quick and easy deployment. The apparatus utilizes aperture channel means 52 proximate to the lower penetrable apron means for the entry of water thereinto through aperture 54, so as to provide ballast to the lower apron means. Additionally, integrated buoyancy channel means 51 are located proximate the upper apron means for maintaining the upper apron means proximate to the surface of the body of water. Additionally, each of the apron segments are curved longitudinally in order to provide effective barrier encompassing characteristics toward a contaminant material which would be facing the front illustrated side of the barrier apron.

In FIG. 5, segment 50 is shown with upper portion 59, buoyancy channel means 51, lower portion apertures 60, and aperture channel means 52, with aperture 54 to allow the entry of water into aperture channel 52. One run 61 of accordion-stacked barrier apron segments is shown in FIG. 6 on supporting means 62. Several of these runs 63, 64 and 65, are shown in FIG. 7 on cutaway pallets 70, 69 and 68 respectively, which enable the quick, facilitated connection to one another through hinging devices at 66 and 67. Through such a construction, several lengths of multi-segmented barrier aprons can be connected to produce a substantially long barrier apron in a matter of minutes.

Three deployment procedures are identified in FIGS. 8 through 10. In FIG. 8, stacked apron segments 73 through 76, making up barrier apron 72 are deployed from an airplane and are opened by starter chute 77. In equivalent fashion, a substantially flexible barrier apron with screens 78 and upper apron means 79 is shown being deployed from roll 83 in airplane 71. Here again, initiation of the deployment is created by starter parachute 77. In FIG. 10, boat 84 is using equivalent roller means 82, to deploy barrier apron 80, which is maintained in proper position relative to the body of water through buoys, such as buoy 81.

The foregoing description and drawings merely explain and illustrate the invention, and the invention is not limited thereto, except insofar as the amended claims are so limited, as those skilled in the art have the disclosure before them will be able to make modifications and variations therein, without departing from the scope of the invention.

What is claimed is:

1. A readily deployable barrier apron apparatus for utilization with contaminant material recovery systems to encompass said contaminant material on the surface of a body of water, said apparatus comprising:

upper impenetrable apron means which extend from below the bottom surface of said contaminant material on said body of water to a position substantially above the upper surface of said contaminant material;

lower penetrable apron means extending downwardly from said upper apron member from a position beneath the lower surface of said contaminant material for maintaining said apparatus in a generally upright position in said body of water while stabilizing said apparatus when said apparatus is moved through said body of water;

said apron means being divided into a plurality of apron segments hingedly attached to each other for quickly and easily deploying said apparatus in said body of water; and uprighting flotation means including a lower channel means having an aperture allowing water to enter said channel means and an upper buoyancy means for effectively positioning said apparatus in an upright position in said body of water and for maintaining said apparatus in position in said body of water.

2. The invention according to claim 1 in which said upper impenetrable apron means comprises a substantially plastic non-porous member, said lower impenetrable apron means comprising a substantially porous screen member attached thereto.

3. The invention according to claim 2 in which said uprighting flotation means comprises buoy means attached to the outer periphery of said upper and lower apron means by buoy attachment means.

4. The invention according to claim 1 in which said upper and lower apron means are integrated into a single integral apron member of plastic material which is impenetrable along an upper portion and penetrable along a lower portion, having a plurality of lower portion apertures therein.

5. The invention according to claim 4 in which said uprighting flotation means comprises buoy means attached to the outer periphery of said upper and lower portions by buoy attachment means.

6. The invention according to claim 1 in which said deployment means for quickly and easily deploying said apparatus comprises a plurality of hinged apparatus segments for stacking said apparatus in a minimum of space and for enabling the extension of said apparatus with a minimum of effort.

7. The invention according to claim 6 in which said apparatus further comprises undercut pallet means for facilitating the connection of a length of apparatus segments to another length of apparatus segments.

8. The invention according to claim 1 in which said deployment means for quickly and easily deploying said apparatus in said body of water comprises roller means around which said apparatus is spooled.

9. The invention according to claim 1 in which said barrier apron apparatus comprises:

a plurality of barrier apron segments pivotally attached to one another respectively thereby facilitating the constant surface positioning of said barrier apron apparatus relative to a turbulent and rolling body of water.

10. A readily deployable barrier apron apparatus for utilization with contaminant material recovery systems to encompass said contaminant material on the surface of a body of water, said apparatus comprising:

upper impenetrable apron means which extend from below the bottom surface of said contaminant material on said body of water to a position substantially above the upper surface of said contaminant material;

lower penetrable apron means extending downwardly from said upper apron member from a position beneath the lower surface of said contaminant material for maintaining said apparatus in a generally upright position in said body of water while stabilizing said apparatus when said apparatus is moved through said body of water;

deployment means for quickly and easily deploying said apparatus in said body of water;

uprighting flotation means for effectively positioning said apparatus in an upright position in said body of water and for maintaining said apparatus in position in said body of water;

said upper and lower apron means, said deployment means, and said uprighting flotation means being operably integrated into an integral apron member, said apron member being divided into substantially small apron segments which are hingedly attached for quick and easy deployment, said apparatus having aperture channel means proximate to said lower penetrable apron means for the entry of water thereinto, thereby providing ballast to said lower apron means, and integrated buoyance channel means proximate to said upper apron means for maintaining said upper apron means proximate to the surface of said body of water;

each of said apron segments being curved longitudinally in order to provide effective barrier encompassing characteristics toward said contaminant material.

* * * * *